Feb. 7, 1928.

H. LEWIS

ADJUSTABLE HANDLE

Filed Jan. 22, 1927

1,658,383

INVENTOR.
Harrison Lewis
BY Westall and Wallace
ATTORNEYS.

Patented Feb. 7, 1928.

1,658,383

UNITED STATES PATENT OFFICE.

HARRISON LEWIS, OF BEVERLY HILLS, CALIFORNIA.

ADJUSTABLE HANDLE.

Application filed January 22, 1927. Serial No. 162,695.

This invention relates to a handle adaptable for various devices and tools whereby the shank and grip sections may be adjusted to various angles and locked in adjusted position. Such a device may be employed for tooth brush handles and such an embodiment is herein described for illustrative purposes only.

It is an object of this invention to provide a device of the character described which is simple, compact and economical. A further object of this invention is to provide a handle of the character described having a locking means which can be easily manipulated by the fingers of the hand grasping the handle. A further object of this invention is to provide a handle which lends itself to a construction of ornate appearance.

Figure 1:
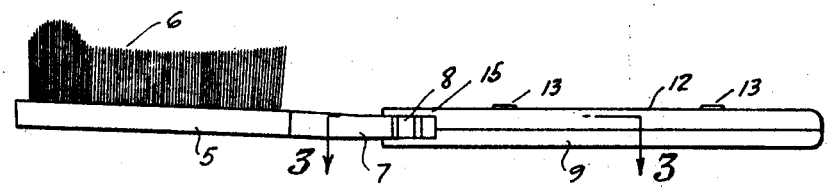
Figure 2:
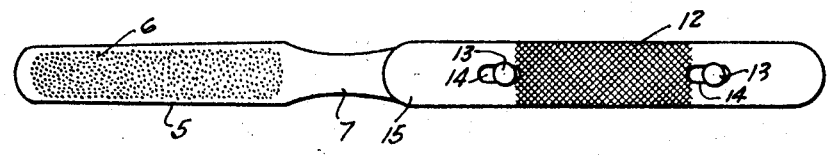
Figure 3:
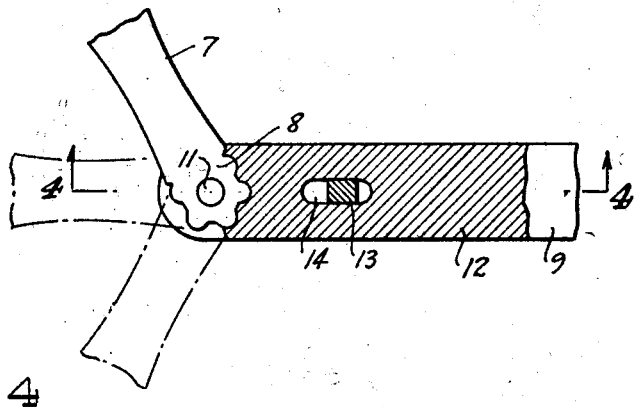
Figure 4:
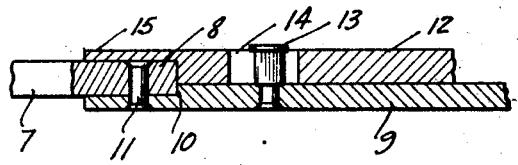

These objects together with other objects and corresponding accomplishments are obtained by means of the embodiment of my invention illustrated in the accompanying drawing, in which:

Fig. 1 is a side elevation of a tooth brush having a handle constructed in accordance with my invention; Fig. 2 is a plan view of the brush; Fig. 3 is a section as seen upon the line 3—3 of Fig. 1 on an enlarged scale, fragments of the handle sections being shown; and Fig. 4 is a section as seen on the line 4—4 of Fig. 3, the shank section being shown in straight line position with the grip section.

Referring with more particularity to the drawing, 5 indicates the back of a tooth brush having bristles 6. The back has a shank section 7 forming a portion of the handle extending therefrom. The structure just described is that usual in tooth brushes. The end of the shank is rounded and formed with teeth to form a segmental toothed wheel indicated by 8. This comprises the joint portion of the shank.

A grip section 9 of the handle is recessed at the joint end to accommodate the portion 8 of the shank and is secured thereto by a pivot pin 11. Slidably mounted upon the grip section 9 is a lock bar 12. This is secured to the bar by means of posts 13 mounted in the grip section and extending through elongated holes 14 in the lock bar. The lock bar is provided with a recess portion at the joint end to provide a shield 15 overlying the segment 8. The section 9 and lock bar 12 together form the complete grip for the handle. These portions correspond in shape so that when the lock bar is in position locking the shank, the grip end of the handle is symmetrical. There are indentations in the ends of the lock bar to mesh with the teeth on the joint end 8.

It is obvious that by retracting the lock bar from the joint end 8, the shank is freed and may be turned to a selected position as shown in Fig. 3. Then by projecting the bar against the joint end 8, the shank will be locked in its selected position. The pressure of the fingers in grasping the handle holds the bar in position and maintains its rigidity.

What I claim is:

1. A handle comprising sections pivotally connected by a hinge joint, one of said sections having teeth disposed about the pivotal axis, the other section being split longitudinally to provide one part slidably mounted on the other part and having indentations corresponding to said teeth for meshing therewith.

2. A handle comprising a shank section and grip section, one of said sections having a joint end with teeth extending therefrom, a pivot pin connecting said sections, said grip section being split longitudinally to form a lock bar slidably mounted on and forming a part of the handle having indentations corresponding to said teeth so as to be movable into mesh with the latter whereby to lock the sections in adjusted position.

3. A handle comprising a shank section having a segmental toothed joint end, a grip end having a depression at its joint end in which the joint end of the shank section is disposed, a pivot connecting said sections, a lock bar corresponding in shape to said grip section, mounted on the latter so as to be longitudinally slidable, said lock bar having a shield end overlying the joint end of said shank section, and indentations corresponding to said teeth for meshing with the latter whereby to lock the sections in adjusted position.

In witness that I claim the foregoing I have hereunto subscribed my name this 6th day of January, 1927.

HARRISON LEWIS.